Dec. 13, 1966  E. J. BOEHS  3,290,881
HYDRAULIC CONTROL APPARATUS
Filed April 17, 1963  2 Sheets-Sheet 1
FIG. 1.
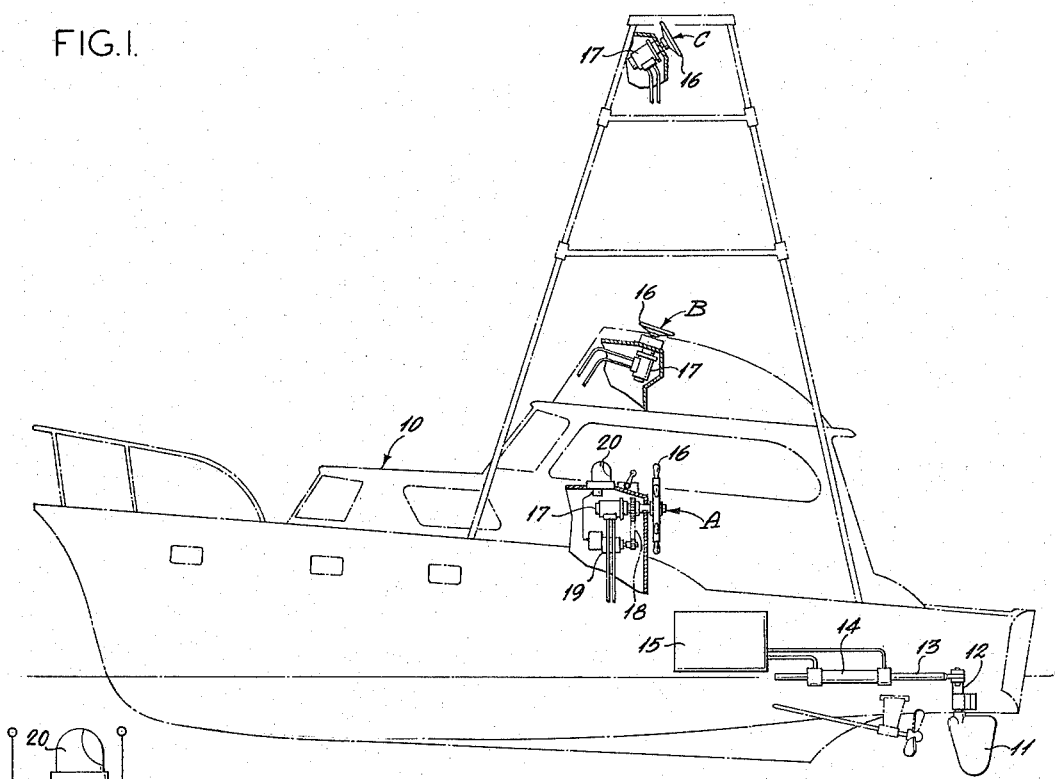
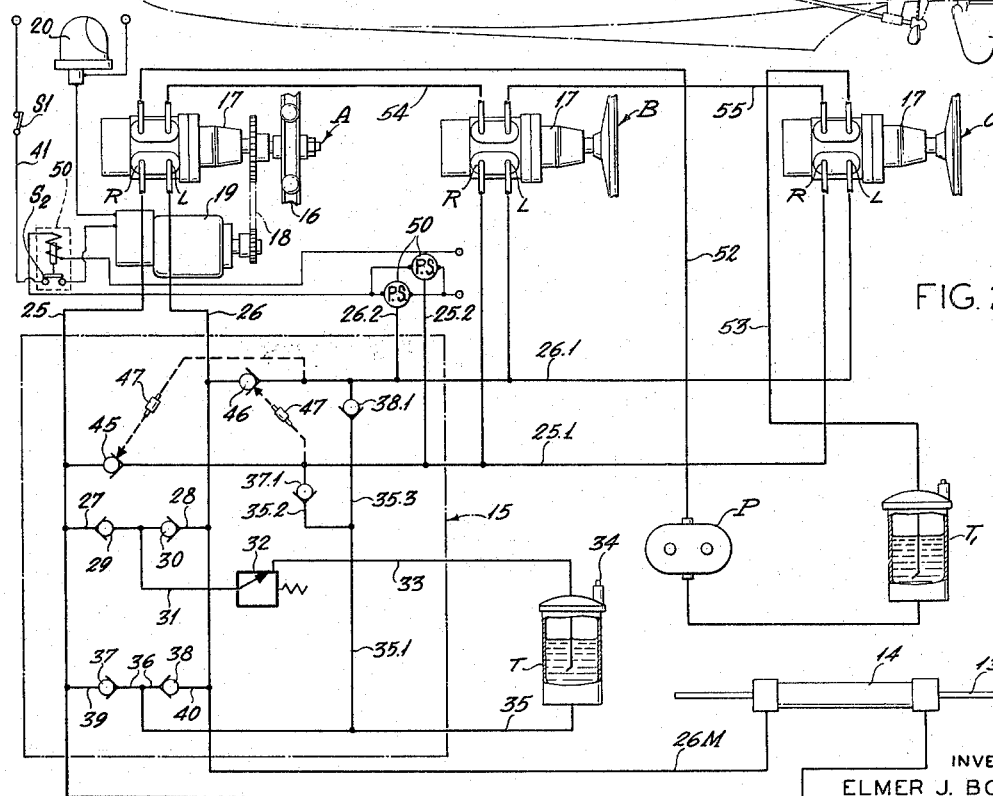
FIG. 2.
INVENTOR:
ELMER J. BOEHS
BY Howson & Howson
ATTYS.

Dec. 13, 1966  E. J. BOEHS  3,290,881
HYDRAULIC CONTROL APPARATUS
Filed April 17, 1963  2 Sheets-Sheet 2
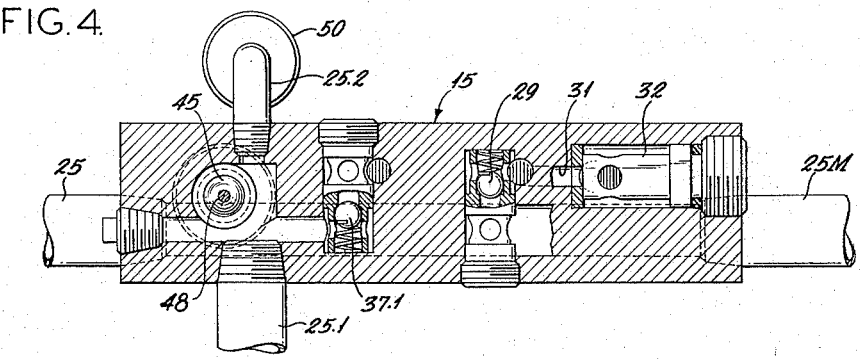
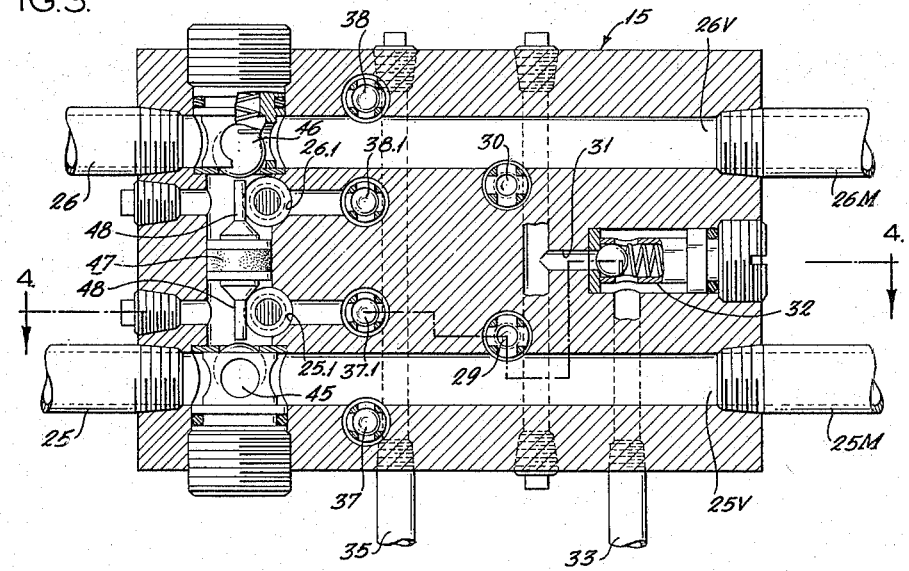
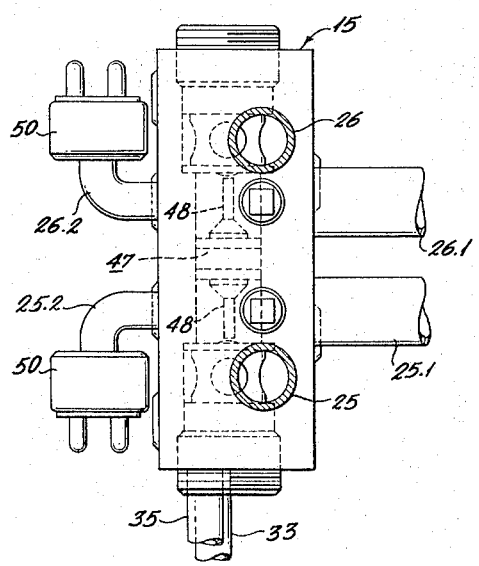
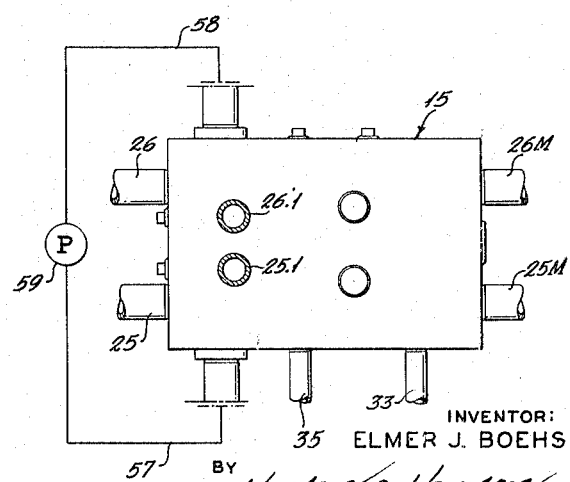
INVENTOR:
ELMER J. BOEHS
BY Howson & Howson
ATTYS United States Patent Office 3,290,881
Patented Dec. 13, 1966

3,290,881
HYDRAULIC CONTROL APPARATUS
Elmer J. Boehs, Maple Glen, Pa., assignor to Fluid Circuits Company, Ambler, Pa., a partnership of Pennsylvania
Filed Apr. 17, 1963, Ser. No. 273,736
8 Claims. (Cl. 60—54.5)

This invention relates to hydraulic control apparatus and has for an object the provision of improvements in this art.

The apparatus is designed particularly for marine use and will be illustrated and explained in this connection; but it can have other uses, as will be understood from the disclosure.

One object of the invention is to provide a hydraulic control system which automatically compensates for overpressure, temperature changes, and air or vacuum inclusions in the fluid.

Another object is to provide a plurality of steering station controls, as, for example in the main cabin, flying bridge, tuna bridge, bow, stern, etc., each of which is immediately available for use at any time independently of all the others and which requires no change in the system to make it available.

Another object is to provide a system in which station steering units can be added in any desired number and without requiring changes at the other station units or in the main system.

Another object is to provide a system which permits take-over supervisory control at the main steering station.

Another object is to provide a system which is compatible with automatic steering devices or "auto-pilots," controlled as by course setting means at a binnacle; which will temporary take over control from the automatic steering device as for "dodging"; and which will restore steering control to the automatic steering device after each interposed action of the manual controls.

Another object is to provide a system which is compatible with power steering, furnishing ready connection with a power system, if available, but which is relatively easy to operate manually except under extreme load conditions, as when the rudder is far over and the boat is travelling at high speed.

The system at each station makes use of a pressure-creating device which may be referred to as a "telemotor."

The above and other objects of the invention as well as various features of novelty and advantages will be apparent from the following description of an illustrative embodiment thereof, reference being made to the accompanying drawings, wherein:

FIG. 1 is a schematic elevational view of a marine craft, such as a fishing boat, equipped with the system of the invention and having a plurality of steering stations;

FIG. 2 is a schematic piping and wiring diagram of the system;

FIG. 3 is a vertical section through a master valve unit in which are located the parts shown in the broken rectangle 15 of FIG. 2;

FIG. 4 is a horizontal section taken on the line 4—4 of FIG. 3;

FIG. 5 is a left end view of the parts shown in FIG. 3; and

FIG. 6 is a reduced side elevation which also shows how a pump may be used as an auxiliary control means.

Referring to FIG. 1, a marine craft, such as a fishing boat 10 is provided with a rudder 11 having a rudder post 12 operated by the piston rod 13 of a fluid steering motor 14. A very simple diagrammatic piston-rod-to-crank arrangement is shown but it will be understood that various arrangements of known types, preferably involving connections to both exposed ends of the piston rod, may be used.

Near the steering motor there is shown a valve assembly or unit 15 which forms a special feature of the present invention. It is shown enlarged far out of proportion for emphasis. This unit could be located at various places in the craft but preferably is located near the other units of the power plant. It is very desirable to provide all valves in one unit.

On the main deck at the main pilot's station or main cabin there is located a main or master steering unit A and at various places where desired on the craft there are located auxiliary control stations B, C etc., as many as desired but only two being shown.

Each station has a hand steering wheel 16 which operates a rotary metering motor-pump unit or "telemotor" 17; and the shaft of the steering wheel at the master station A may also have power connections, as by a chain belt 18 and suitable sprockets, to be operated by an autopilot 19 from a binnacle 20 in a known and usual manner.

The metering motor-pump unit or telemotor 17, in the simplest form of the invention, may be a metering pump unit operated by the steering wheel, but it is preferable, for customer selection and other reasons, to have a more versatile system such as is shown in FIG. 2 and for such a system the unit 17 is selected to provide for manual operation as a pump or for power operation as a motor-pump.

One such unit which may be used is known on the market as "Orbitrol," this being procurable from Char-Lynn Company of 2843 26th Ave. S., Minneapolis 6, Minn. and described in their sales pamphlet Form No. OT-1060. The literature of that company indicates that application for patent has been filed and it is desired that this may be referred to when and if a patent issues thereon. It is belived to be unnecessary to illustrate or describe this unit herein but it may be helpful to explain that it comprises a gear type pump-motor with an orbital rotor and self-centering follow-up valve means which controls a plurality of ports between the motor chamber and inlet and exhaust chambers in such manner that the metering chamber connections follow the rotor movement in either direction and reverse between inlet and outlet automatically when the rotor direction is reversed by the steering wheel. This telemotor device may be operated by the steering wheel alone as a pump or may be operated conjointly by the steering wheel and motive fluid from a pump as a motor-pump unit, in which case the movement of the steering wheel serves merely to meter the flow of the power fluid from the device (acting as a metering pump) into the fluid system provided by the present invention.

Referring to FIG. 2, it is seen that the master steering unit A is provided with hydraulic fluid lines 25 and 26 connected to ports of the motor-pump device 17 which are designated as R (right) and L (left), the lines 25 and 26 extending to opposite ends of the cylinder of the steering motor 14 having the double-ended piston rod 13.

When movement of the steering wheel 16 and its motor element to right or left is produced, this will increase the hydraulic fluid pressure in the line 25 or 26 respectively and move the piston rod 13 for steering to the right or to the left.

However, there is interposed in the fluid lines 25, 26 certain valve mechanism which is comprised in the valve unit 15 shown in broken lines in FIG. 2 which is provided by the present invention to assure prompt and smooth operation of the steering motor regardless of temperature changes between operations, the valve arrangement providing pressure relief and purging of air, gas and vacuum in the system at all times.

The system, specifically the valve unit 15 as here shown, includes branch lines 27 and 28 with check valves 29 and 30 opening under pressure increase respectively from the fluid lines 25 and 26. A common interior fluid line 31 leads fluid through a pressure valve 32 by way of a line 33 to an air pressurized sump or tank T. Initial air pressure in the sump tank T may be established by an air charging valve 34. Such air as may be entrained in the system will escape from the liquid and remain in the upper part of the tank T. The system has been operated successfully with a pressure of 25 p.s.i. in the sump tank.

Fluid from the tank T can return to the system by way of a fluid line 35 extending from the bottom of the tank T to a branch line 36 extending to check valves 37 and 38 opening to branch lines 39 and 40 and thence to main lines 25 and 26 respectively. This assures that liquid free from air and overpressure will be supplied constantly to the main lines and that no vacuum or cavitation can exist in the line at any time regardless of temperature changes or air leakage into the system or leakage of fluid from the system.

The lines from the valve unit to the rudder motor 14 are designated as 25M and 26M connected to the passages 25V and 26V of the valve unit.

The above describes the simplest aspect of the system wherein only one steering wheel is used and wherein neither the auto pilot nor the power steering mechanism is used.

When the auto-pilot is used it has, in the simple mechanical system illustrated in FIGS. 1 and 2, a mechanical chain drive 18 to the master steering wheel shaft. It will be assumed that the auto-pilot has a clutch in its shaft which drives the chain 18 which is kept engaged by the energization of a solenoid (not shown) served by a power line 41. By providing a manual switch S1 in the line 41 at the master steering station the auto-pilot may be rendered operative or inoperative at will.

Auxiliary stations B, C etc. are provided by connecting auxiliary lines 25.1 and 26.1 into the lines 25 and 26 respectively for the R and L ports respectively of the auxiliary motor-pump units 17 and by providing, in the lines 25.1 and 26.1 respectively, check valves 45 and 46 which close against pressure in the main lines 25 and 26 and open for increased pressure in the lines 25.1 and 26.1. The check valves 45 and 46 are ganged, as shown in FIG. 3, by a piston cylinder device 47 so that when increased pressure in either line 25.1 or 26.1 opens one of the check valves, a piston rod 48 opens the other check valve to permit return flow from the system to the other line 25.1 or 26.1. The device 47 per se is a market item, only its use in the system here being novel.

It is thus seen that when the master steering wheel at station A is operated the pressure is kept clear of the branch lines 25.1 and 26.1 by the check valves 45 and 46 and the presence of any number of auxiliary stations does not in any way affect the operation of the rudder from the master station. However, when the steering wheel at any one of the auxiliary stations is operated (if the master steering means is not active) it will interpose its control on the system by cutting into the fluid system through the opening of the check valves 45 and 46. The auxiliary system acts through the main system and purges its auxiliary system fluid in the same way as described for the main system. Return line 35.1 with branch lines 35.2, 35.3 with check valves 37.1 and 38.1 respectively lead fluid from the pressure tank T to the lines 25.1 and 26.1 respectively.

Means are provided for deactivating the auto-pilot automatically upon the movement of a steering wheel at any auxiliary control station. The same kind of means could be installed for the master station but it is simpler to use the manual switch S1 there, as explained, to de-energize the solenoid to disconnect the clutch of the auto-pilot. As shown in FIG. 2, for each line 25.1 and 26.1 there is provided a branch pressure line 25.2 or 26.2 leading to a spring-resisted fluid-pressure-actuated device 50 which opens a normally closed switch S2 in the line 41 of the clutch solenoid. As soon as the steering movement at the auxiliary station ceases, the switch S2 re-closes and the auto-pilot resumes control.

It may be noted that most auto-pilots are set to control within a 60 degree arc and if the rudder should be moved out of this range by any of the steering wheels a resetting will be required. This is a standard condition for most auto-pilot systems and is mentioned here only because the operator at a remote auxiliary station may be required to turn the steering wheel back within the original course range if it was moved too far during the interposed dodging action. The steering wheel itself remains in a stable neutral position wherever it may be left, hence the pilot would have to determine by means other than by observing the steering wheel position whether or not he had steered out of the set auto-pilot arc.

Power steering, if available, may be used at any time. A pump P, driven by any suitable power means, is connected by a pressure line 52 and a return line 53 with the motor elements of the devices 17 of all stations A, B, C etc., jumper fluid lines 54, 55 etc. connecting the outlet of one station motor to the inlet of the next station motor. The pressure line 52 leads from the pump to the inlet port of the motor at the master control station A and the return line 53 leads from the outlet port of the motor at the last station (C, here) back to the reservoir of the pump, a pressure tank designated as T1.

FIGS. 3 to 6 show how the body of valve 15 may be formed from a single block of material with suitable passages, made as by drilling, and capped where not used for connections, as by plugs of proper size threaded into the ends of the passages or bores. The valves and other parts in the valve block, as well as the pipe line connections, are all designated by the same reference characters as are used in the diagram and elsewhere, so it is believed that the views will be clear without further description.

It should be noted in FIG. 6 that the normally plugged ends of the bore for the gang check valve operating piston 47 are used for connections 57 and 58 of a steering pump 59 which can be used instead of the main steering device 17 at station A for operating the rudder motor, the pump 59 being turned reversely as desired to steer right or left by hand or by power available on the boat. The lines 57 and 58 enter the valve body in common passages with the pipes 25 and 26 respectively, equivalent to connecting by pipe fittings into the lines 25 and 26 but more convenient to have connections at the main valve body.

Operaton has been explained as the description proceeded. Briefly, there are no operational procedures to follow because of the equipment provided hereby. All that is necessary is to steer from any position where convenient. If an automatic pilot is used it will be necessary, as it was in the past, to disconnect from the automatic pilot at the master station when steering by hand. At the auxiliary control stations this is done automatically.

It has been mentioned that the master steering control, when operated, takes over control from the auxiliary stations, even if an attempt is made to operate the auxiliary controls at the same time. This is true because the effective area of the check valves 45 and 46 which is exposed in the main passages 25V and 26V is greater than the area exposed on the other side to lines 25.1 and 26.1. In addition, the springs of the check valves work with the master control and against the auxiliary controls.

It is thus seen that the invention provides a very simple and versatile steering system which adds facilities for the master station and which further makes it possible to steer at will from any number of auxiliary stations.

While one embodiment of the invention has been described for purposes of illustration, it will be understood that there may be various embodiments and modifications within the general scope of the invention.

I claim:

1. Hydraulic control apparatus, comprising in combination: a main control device including a reversible metering pump, a reversible fluid-operated control motor, main fluid conduit means between said main control device and said motor for operating the motor in opposite directions when the main control device is operated in opposite directions, an auxiliary control device including a reversible metering pump, auxiliary fluid conduit means between said auxiliary control device and said main fluid conduit means connected for replacing the action of the main control device by the action of said auxiliary control device, and valve means for isolating said auxiliary conduit means from said main conduit means when said main control device is operated.

2. Hydraulic control apparatus as set forth in claim 1, wherein said isolating valve means includes ganged check valves with a plunger operator between them for opening either check valve when the other is opened.

3. Hydraulic control apparatus as set forth in claim 1, which further includes a pressure tank, and intake and return fluid conduit means with check valve means between said tank and said main conduit means and said auxiliary conduit means.

4. Hydraulic control apparatus as set forth in claim 1, which further includes power fluid supply means connected to all of said control devices for operating said main control device and said auxiliary control device by power when either is moved in either direction selectively.

5. Hydraulic control apparatus as set forth in claim 1, which further comprises automatic selective driving means for operating said main control device, and means operated by said auxiliary control device for rendering said automatic selective driving means inoperative when said auxiliary control device is operated.

6. Hydraulic control apparatus as set forth in claim 5, in which said means for rendering the automatic selective driving means inoperative includes a fluid pressure operated device responsive to increased fluid pressure in said auxiliary fluid conduit means when said auxiliary control device is moved in either direction from any rest position.

7. Hydraulic control apparatus, comprising in combination: a master control device including a reversible fluid pump, a reversible power motor, main forward and reverse fluid lines between said master control device and said motor, an automatic selective driving means connected to operate said master control device, means at the master control device for eliminating the action of said automatic selective driving means, an auxiliary control device including a reversible fluid pump, auxiliary forward and reverse fluid lines between said auxiliary control device and said main forward and reverse fluid lines respectively, ganged check valves between said auxiliary fluid lines and said main fluid lines which are opened together in response to pressure change in either auxiliary fluid line, and means responsive to change in pressure in either auxiliary fluid line for eliminating the action of said automatic selective driving means.

8. Hydraulic control apparatus as set forth in claim 7, which further includes a pressure tank, intake and return lines between said tank and said main and auxiliary fluid lines, and check valves in said intake and return lines controlling the direction of fluid flow therein in the intake and return direction respectively.

References Cited by the Examiner

UNITED STATES PATENTS

| | | | |
|---|---|---|---|
| 2,156,976 | 5/1939 | Fischel | 114—144 |
| 2,351,977 | 6/1944 | Kronenberger et al. | 114—144 |
| 2,368,659 | 2/1945 | Heineck et al. | 60—54.5 |
| 2,499,563 | 3/1950 | Bill | 60—97 |
| 2,669,096 | 2/1954 | MacDuff | 60—54.5 |
| 2,719,502 | 10/1955 | West | 114—144 |

MARTIN P. SCHWADRON, *Primary Examiner.*

ROBERT R. BUNEVICH, *Examiner.*